United States Patent [19]

Singeetham

[11] Patent Number: 4,921,284

[45] Date of Patent: May 1, 1990

[54] HIGH STRENGTH SPLIT CLAMP FOR PIPE FLANGES

[75] Inventor: Shiva P. Singeetham, Houston, Tex.

[73] Assignee: FMC Corporation, Chicago, Ill.

[21] Appl. No.: 344,736

[22] Filed: Apr. 28, 1989

[51] Int. Cl.⁵ .............................................. F16L 23/00
[52] U.S. Cl. ..................... 285/415; 285/114; 285/334.2; 285/354; 285/363
[58] Field of Search ............... 275/414, 415, 387, 388, 275/419, 363, 405, 334.2, 373, 114, 354, 18, 24, 27

[56] References Cited

U.S. PATENT DOCUMENTS

| | | | |
|---|---|---|---|
| 262,581 | 8/1882 | Doolittle | 285/414 X |
| 1,913,030 | 6/1933 | Hux | 285/415 X |
| 2,569,333 | 9/1951 | Peterson | 285/415 X |
| 3,418,009 | 12/1968 | Pollia | 285/414 X |
| 4,334,342 | 6/1982 | Hall | 285/415 |

*Primary Examiner*—Dave W. Arola
*Attorney, Agent, or Firm*—W. W. Ritt, Jr.; R. B. Megley

[57] ABSTRACT

A splitt clamp assembly for pipe flanges, comprising an outer ring with internal threads for securing it to an externally threaded first pipe flange, and a plurality of arcuate segments interconnected by keys into an inner ring, means to secure the inner ring to a second pipe flange, and means to secure the inner and outer rings together in a relative non-rotable manner.

6 Claims, 3 Drawing Sheets

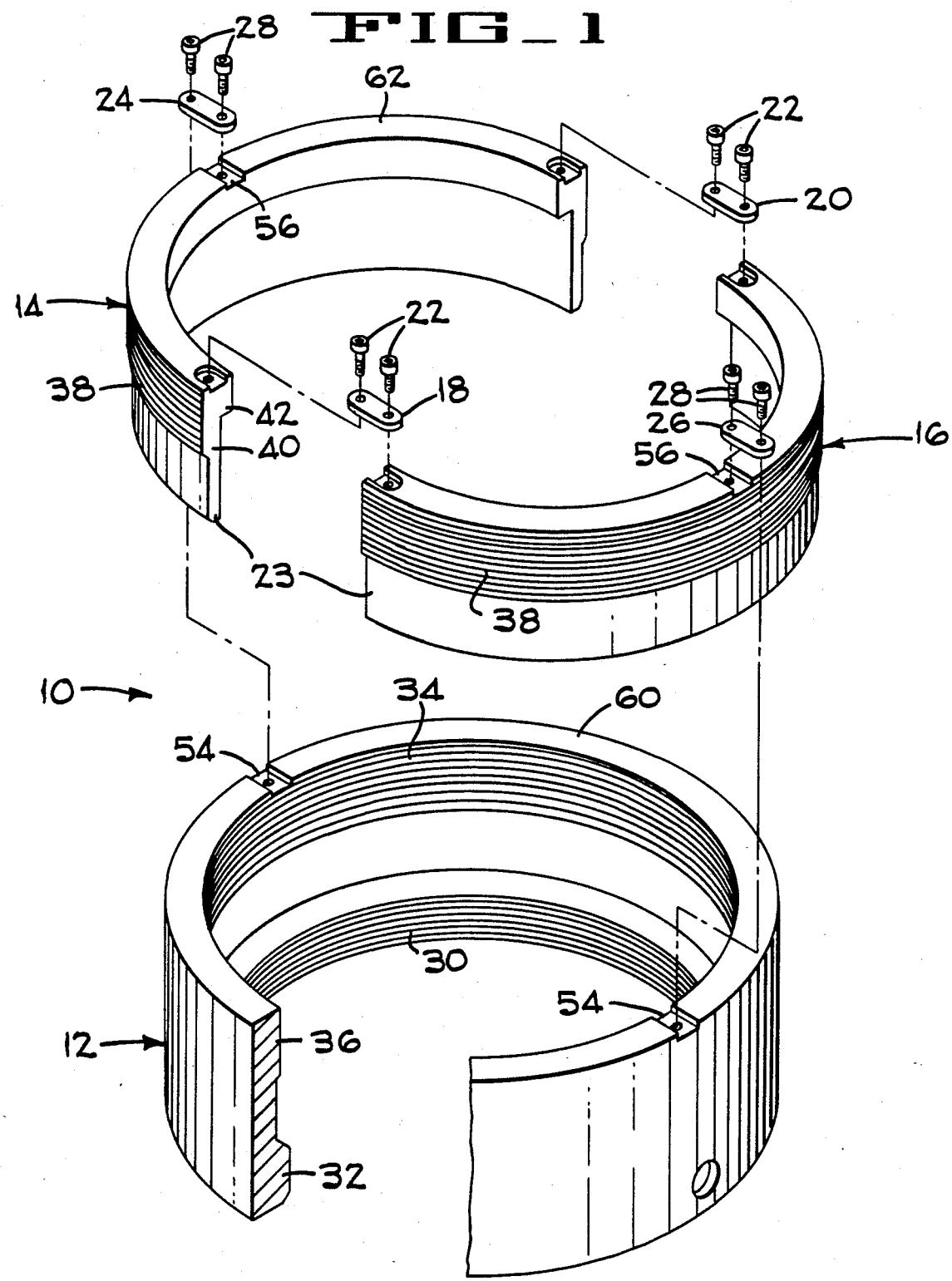

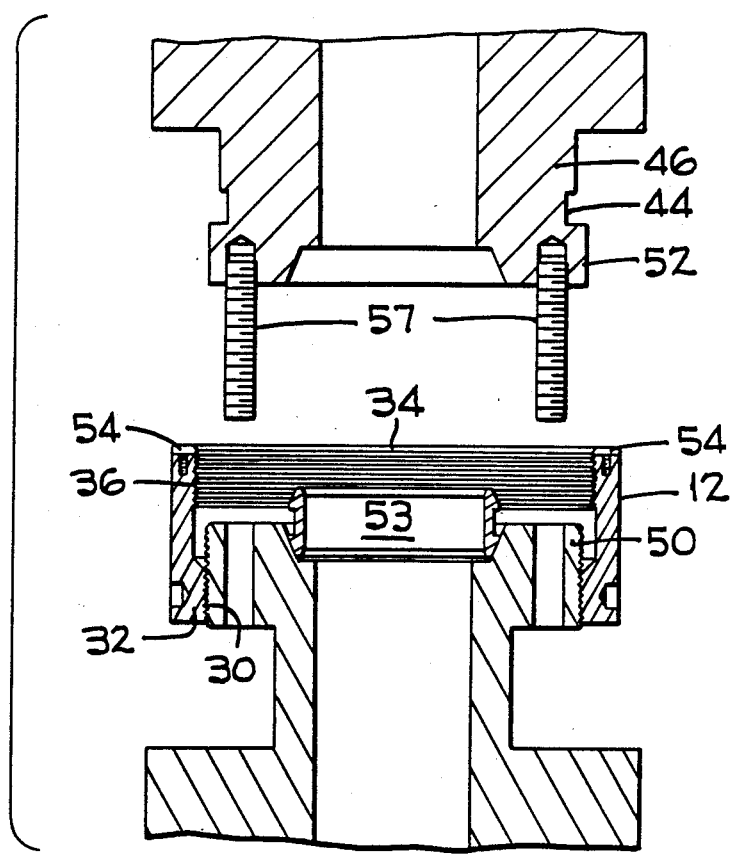
FIG_2
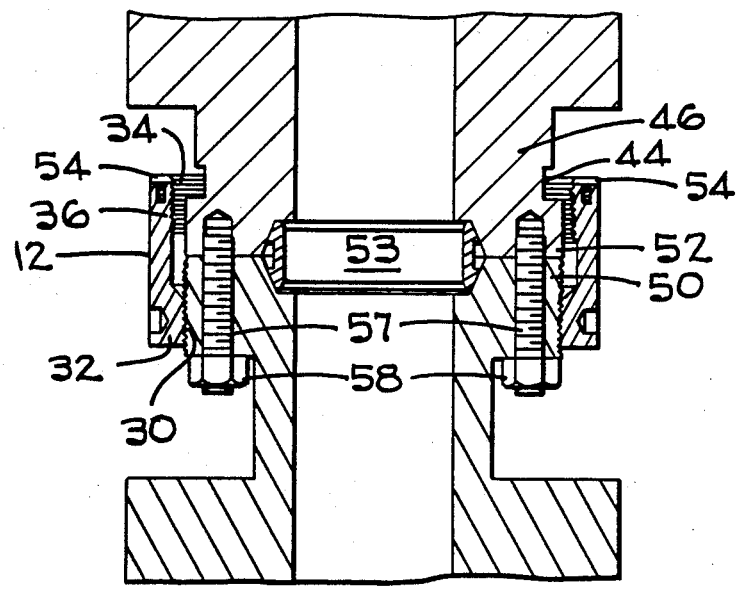
FIG_3

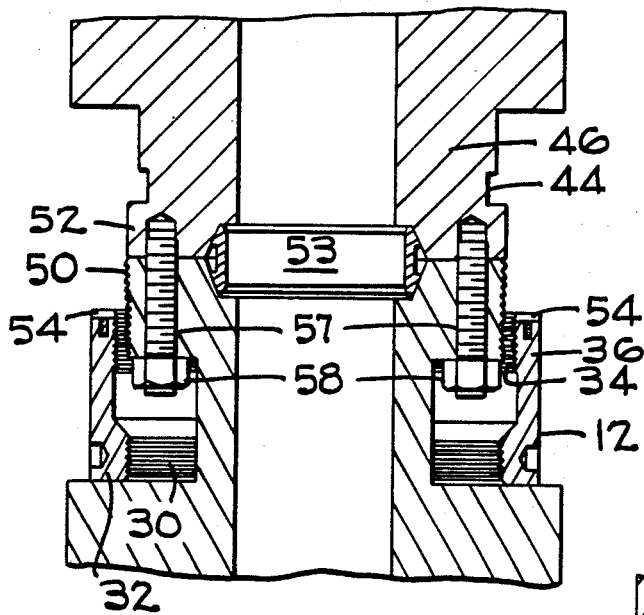
FIG_4
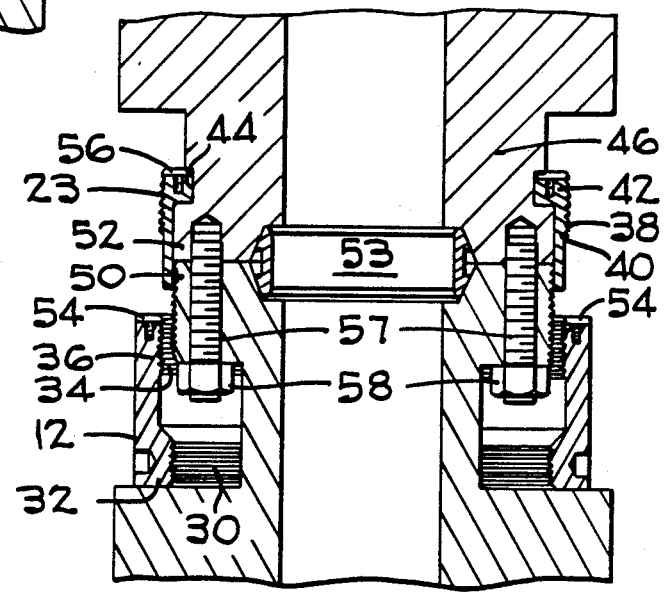
FIG_5
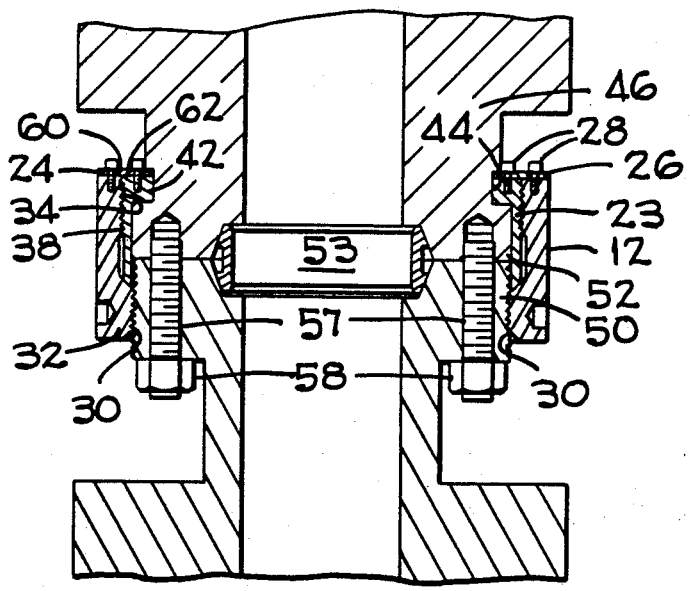
FIG_6

HIGH STRENGTH SPLIT CLAMP FOR PIPE FLANGES

BACKGROUND OF THE INVENTION

This invention relates to pipe flange connections, and more particularly to devices for strengthening the connection between API and other pipe flanges.

In the oil and gas industry API (American Petroleum Institute) flange bolted connections have traditionally been used to fasten several forged body components together for many subsea wellhead and completion systems. As equipment is installed in ever deeper waters, the loads and moments associated with drilling or completion risers grows. Recently, many subsea equipment assemblies have used large diameter high pressure flanges, e.g. a 13⅝ inch, 10,000 psi. flange on a 4×2, 5000 psi working pressure tree, to withstand the loads and moments. These larger flanges have diameters much larger than what is usually needed for the rest of the forged body, making forgings more costly, weight more, and requiring a special shape.

During design and development of an improved guidelineless subsea completion system, a new problem with conventional API flanges and their connecting bolts was discovered. The design water depth for the system is 1000 meters (3281 ft.), with the possibility of going down further to 1800 meters (5906 ft.). Riser loads due to ocean currents and waves can generate bending moments up to 850,000 ft-lb at the top of the tree and 1.1. million ft-lb at the base of the tree. Analysis of conventional API flanges indicated that the flange bolts fail at these loads, and even oversized API flanges will not meet the task.

SUMMARY OF THE INVENTION

Broadly considered, the present invention comprises a split clamp assembly that is designed for strengthening API and other pipe flange connections, the assembly including an outer ring with a first set of internal threads for securing it to an externally threaded first pipe flange, and two or more arcuate segments interconnected by keys or other appropriate means into an inner split ring having means to secure it to a second pipe flange and an external threaded portion to engage a second set of interior threads in the outer ring. When properly installed, a split clamp assembly according to this invention can be used to increase the structural capability of any flanged connection without increasing the size or diameter of the flange itself to accommodate external structural loads. This allows the designer to size the flange according to the equipment of which it is a part and then add a split clamp assembly of the present invention to withstand the extra loads. The bolts of a conventional bolted flange connection constitute its weak link, whereas the strength of a flange with this split clamp assembly is substantially greater than a similar flange without the split clamp assembly.

In a bolted flange connection the discrete bolts are placed under tension to energize the gasket seal during assembly and are subjected to additional tension while the flange is at working pressure. The split ring assembly and ring components of the split clamp assembly transfer any additional load or moment from one flange body to the other flange body, around the bolts, thereby increasing the overall structural capacity. The result is that the major portion of any external bending moment is taken up through an external threaded ring instead of conventionally through the flange bolts while pressure integrity is still primarily maintained by the bolts.

A split clamp flange connection according to the present invention provides a distinct advantage in developing deepwater system because of its capability of withstanding very high loads and moments with a slender shape. Raw material size of the components being bolted together need not be dictated by oversized end connections, minimizing forging sizes, weights and complex shapes all of which reduce forging costs. A clamp assembly of this type also provides the strongest connection method known for its space envelope, making it practical in tight spaces.

In fact, tests have demonstrated that flanges with a split clamp assembly according to the present invention will hold pressure and bending moment loads with bolts removed, so that any bolt failure in the field will not affect the integrity of the connection. Thus, the split clamp assembly can be used to withstand accidental impact and high bending moments while the bolts carry smaller continuous routine loads.

BRIEF DESCRIPTION OF THE DRAWINGS

FIG. 1 is an exploded isometric view of a split clamp assembly according to the present invention, with a portion of the outer ring thereof broken away to better show its internal configuration.

FIGS. 2-6 are fragmentary central sections of a pair of pipe flanges and the split clamp assembly of FIG. 1, showing in sequence how the flange connection is made up with this assembly.

DESCRIPTION OF THE PREFERRED EMBODIMENTS

As illustrated primarily in FIG. 1, a high strength split clamp assembly 10 according to the present invention comprises an outer ring 12, a pair of arcuate ring segments 14, 16, a pair of segment retainer keys 18, 20 each with cap screws 22 for securing the two ring segments 14, 16 together to form an inner ring 23, and a similar pair of anti-rotation keys 24, 26 with cap screws 28 for preventing rotation of the connected ring segments 14, 16 with respect to the outer ring 12 when these elements are fully assembled.

The outer ring 12 includes a first set of internal threads 30 on the surface of an inwardly-extending lower portion 32 for securing the ring to an external-threaded pipe flange, and a second set of internal threads 34 on its upper portion 36 that cooperate with external threads 38 on the upper portion 40 of the split ring 23 to secure the rings 12, 23 together. At the upper end of the split ring 23 a radial flange 42 projects inwardly to reside in and cooperate with an external annular groove 44 (FIGS. 2-6) in a piper 46 for securing the ring 23 to the pipe in functional position.

Referring now to FIGS. 2-6, the split clamp assembly 10 is installed about a pair of pipe flanges 50, 52 to provide a high strength connection therebetween, as follows. The outer ring 12 is threaded onto the pipe flange 50 as shown in FIG. 2, and the flanges 50, 52 are then made up with an annular gasket or other seal element, such as the illustrated ring gasket 53, and preloaded by circumferentially spaced studs 57 and nuts 58 in the conventional manner, as represented by FIG. 3. The outer ring 12 is then rotated further in the same direction to advance and ultimatedly disengage it from the flange 50 as illustrated in FIG. 4.

The two split ring segments 14, 16 are then fitted around the flange 52 with their portions of the radial flange 42 extending into the annular groove 44 of the pipe 46, and the segment retainer keys 18, 20 positioned and secured in place on the segments 14, 16 with the cap screw 22, as seen in FIG. 5. At this point the segments 14, 16, being secured together by the keys 18, 20 form the split ring 23.

The outer ring 12 is then threaded back onto the flange 50 and rotated further until its threads 34 contact the split ring threads 38. The split ring 23 is then rotated until the start of its threads 38 aligns with the start of the threads 34. The outer rings 12 is then rotated further until its upper end surface 60 becomes approximately flush with the upper end surface 62 of the split ring 23 and the anti-rotation key slots 54, 56 in these two surfaces are aligned. The anti-rotation keys 24, 26 are then inserted in the slots 54, 56 and secured in place by the cap screws 28 to lock the split ring 23 to the outer ring 12. The assembled split clamp 10 is then rotated to advance it toward the flange 50 until the connection of the flanges 50, 52 is snug tight, as shown in FIG. 6.

Upon completion of the foregoing procedure the flange nuts 58 are loosened to permit the flanges 50, 52 to separate until restructed by the split clamp 10. At this point the split clamp 10 is maintaining the preload at the flange faces, albeit at a slightly lesser amount than originally achieved with the studs 47 and nuts 58. The nuts 58 are then re-torqued to a lower setting depending on design load requirements, to share the external loads on the connection with the split clamp 10.

Although the best mode contemplated for carrying out the present invention has been shown and described herein, it will be apparent that modification and variation may be made without departing from what is regarded to be the subject matter of the invention.

What is claimed is:

1. A split clamp apparatus for providing a high strength connection between a pair of pipe flanges, said apparatus comprising
    (a) an outer ring having first and second sets of internal threads;
    (b) at least two arcuate ring segments which form a split ring when joined together in end-to-end manner, said split ring having a set of external threads engageable with the outer ring second thread set, and means for securing said split ring to a pipe in a pipe flange-surrounding position;
    (c) means for securing the arcuate ring segments together in end-to-end manner; and
    (d) means for securing the split ring to the outer ring against relative rotation when said outer ring is threaded onto said split ring into proper flange-clamping position.

2. A split clamp according to claim 1 wherein the outer ring first thread set functions to secure said ring to a piper flange.

3. A split clamp according to claim 2 wherein the means for securing the split ring to a pipe comprise an inner radial flange on said split ring for residing in an external annular groove on said pipe.

4. A split clamp according to claim 1 wherein the means for securing the ring segments together comprise a key for spanning a segment-to-segment juncture, and means for securing said key to each of the two segments at said juncture.

5. A split clamp according to claim 1 wherein the means for securing the split ring to the outer ring against relative rotation comprises at least one key that is secured to both rings when in functional position.

6. A split clamp according to claim 5 wherein there are two keys positioned at diametrically opposite functional locations on the ends of both rings.

* * * * *